Jan. 26, 1932.   W. MALM   1,842,759
TRANSMISSION OF MOTION PICTURES AND THE LIKE
Filed Aug. 22, 1927   3 Sheets-Sheet 1

W. Malm INVENTOR.

Jan. 26, 1932.  W. MALM  1,842,759
TRANSMISSION OF MOTION PICTURES AND THE LIKE
Filed Aug. 22, 1927   3 Sheets-Sheet 2
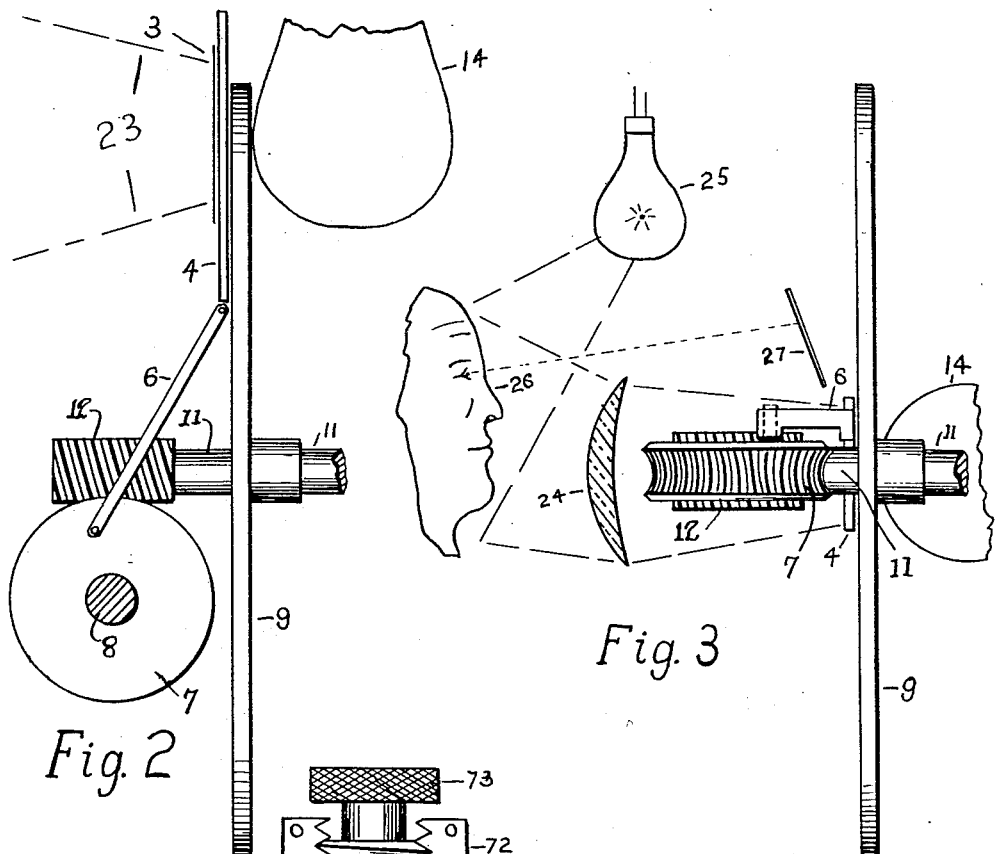
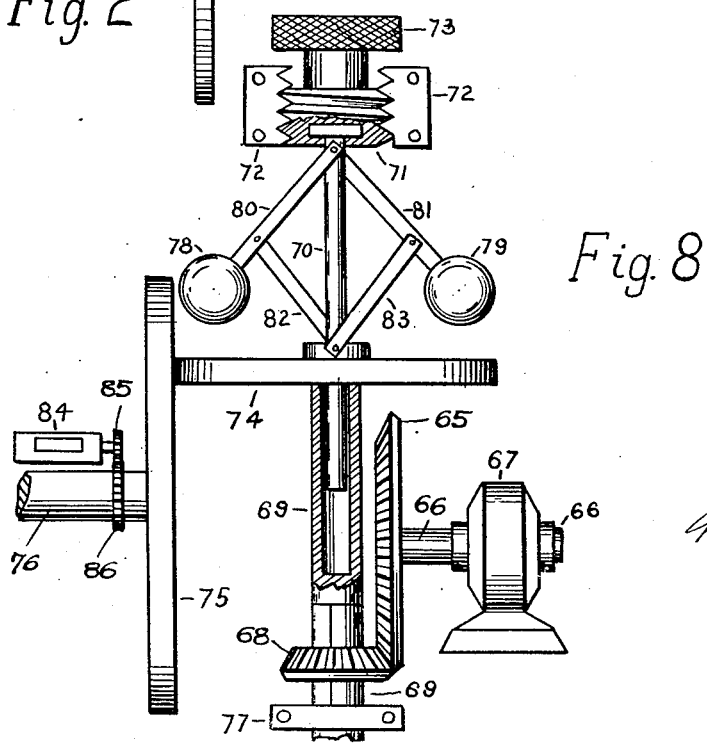
*INVENTOR.*

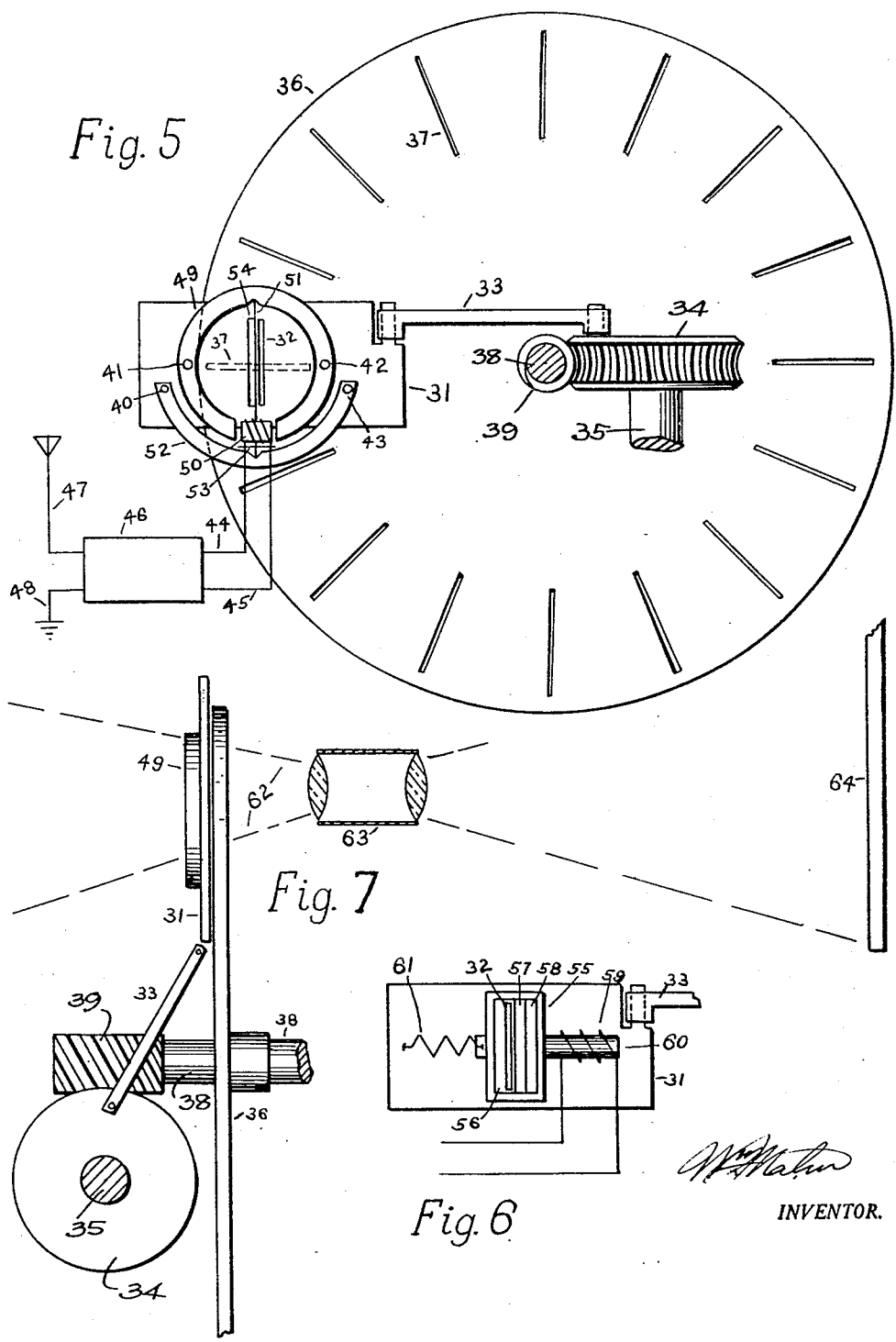

Patented Jan. 26, 1932

1,842,759

UNITED STATES PATENT OFFICE

WILLIAM MALM, OF NEW ORLEANS, LOUISIANA

TRANSMISSION OF MOTION PICTURES AND THE LIKE

Application filed August 22, 1927. Serial No. 214,753.

This invention relates to devices for sending and receiving images of motion pictures and movements of living objects by means of radio transmission or direct wire transmission, and particularly to methods of recording images at remote place or places in such minuteness of detail so as to be an exact likeness of original images.

In devices of this sort, as is well known, the received images were displayed in miniature, there being no means of escapement of said images for projection and enlargement upon a screen or similar structure.

The object of my invention is to provide simple, practical means for causing a motion picture film to pass between a light source and a light responsive device impulsive to a radio transmitting device; and, also means for causing only the light passing thru minute parts of the picture on said film to strike the light responsive device at one time, said means to provide for the exposure of these minute portions of said film at such speed and nicety so as to explore the entire surface of picture on said film in less than one-sixteenth of a second and in repeated successions.

A further object of my invention is to provide an image exploring mechanism having square holes or apertures which obviously pass more light than the usual round holes, and play an important part in the distribution of light values in the construction of the received image.

A further object of my invention is to provide simple, practical light impulsive devices responsive to a radio receiving device and interposed between a light source and means for projection of images upon a screen or similar structure; and also means for causing said light impulsive devices to react with said light source in such manner as to re-construct transmitted images in exact likeness of original images for projection upon a screen or similar structure.

A further object of my invention is to provide suitable ultra high speed light shutter devices, capable of modulating light rays of unlimited intensity at such frequencies as required in the practical application of the invention.

A further object of my invention is to provide simple, practical means for automatically maintaining synchronism between sending and receiving devices.

Other and ancillary objects of my invention will appear hereinafter.

Figure 1:
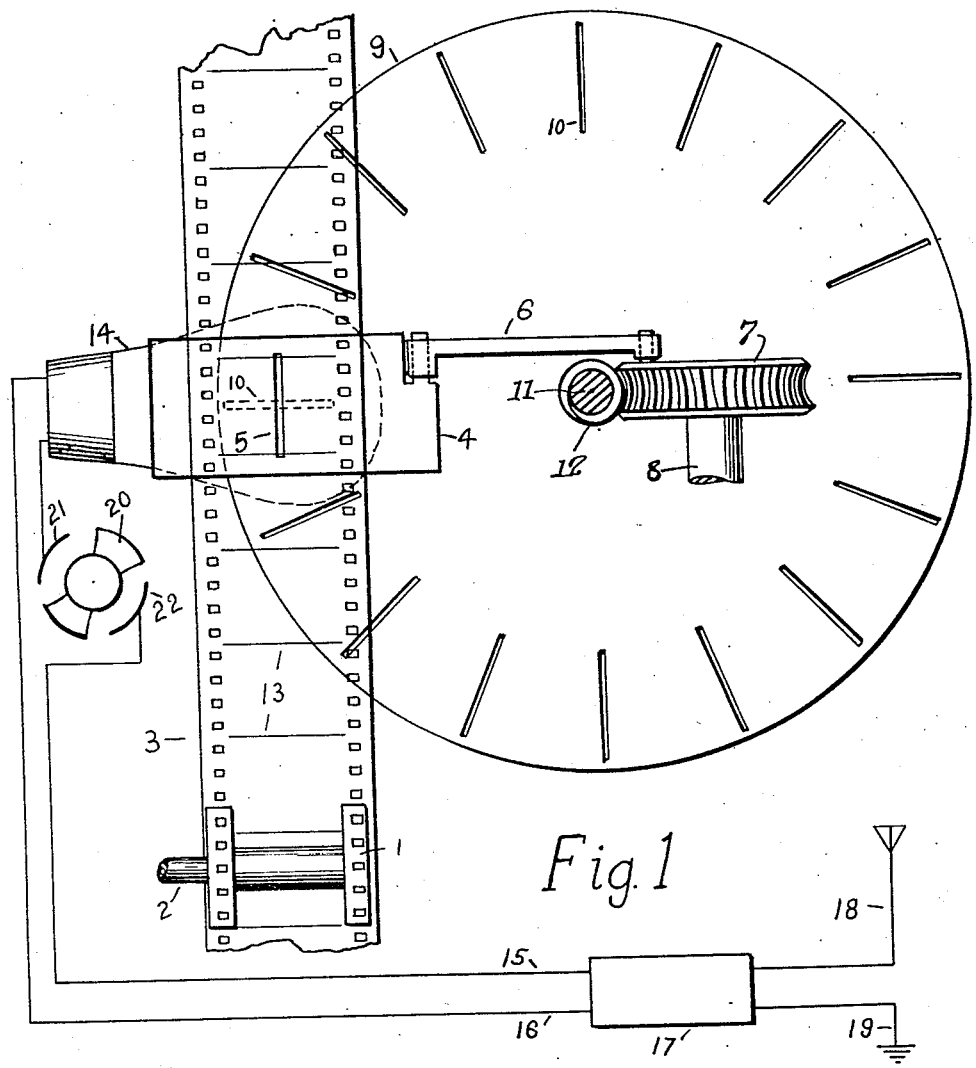
Figure 4:
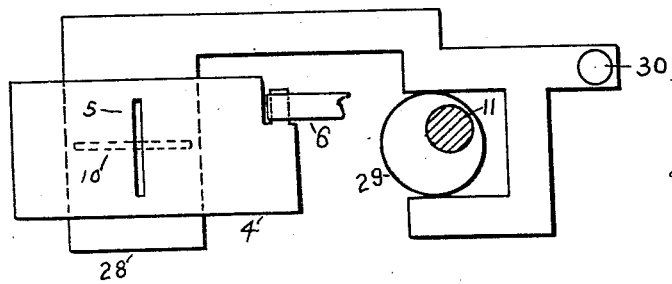

Referring to the drawings, Figure 1 is a front elevation of the transmitting devices. Fig. 2 is a plan view of Fig. 1, showing path of light 23 and other parts not clearly shown in Fig. 1. Fig. 3 is a side elevation of Fig. 2, showing how I propose to use the devices for transmitting images of living objects, by eliminating film driving devices and film 3 shown in Fig. 1, and substituting therefor a suitable lens 24 for receiving light rays reflected from object 26. Fig. 4 shows how I can conserve space by substituting vertically reciprocating plate 28 for disc 9 in Figs. 1 to 3, or disc 36 in Figs. 5 and 7. Fig. 5 is a front elevation of the receiving devices. Fig. 6 shows a light graduating shutter which I propose to use for effecting tone quality of reproduced images. Fig. 7 is a plan view of Fig. 5, showing path of projecting light 62. Fig. 8 shows the automatic speed synchronizing devices which govern the driving means of both transmitting and receiving devices.

In Figure 1, 1 is a sprocket wheel driven by shaft 2 and imparting an intermittent movement to film 3. Film 3 passes between light source (not shown, for simplicity) and horizontally reciprocating plate 4 having a vertical slot 5 and reciprocated by arm 6 attached to worm gear 7 fixed on shaft 8. Revolving disc 9 having a plurality of slots 10, is fixed on shaft 11 which drives worm 12. The relation between worm 12 and worm gear 7 is such that each time one horizontal slot 10 in disc 9 moves across picture frame 13 in film 3, the vertical slot 5 in horizontally reciprocating plate 4 will have moved horizontally a distance equivalent to the width of said vertical slot 5. 14 is a light responsive device located behind disc 9, in path of light 23 (shown in Fig. 2), and electrically connected to terminals 15 and 16 of radio transmitting device 17 having aerial and ground connections 18 and 19 respectively. Revolving switch 20 opens and closes electrical circuit of light responsive device 14 by means of contacts 21 and 22, the relation between said revolving switch 20 and sprocket wheel 1 being such that said switch 20 will render the light responsive device 14 inoperative while film 3 is in motion and operative while film 3 is at rest, thereby eliminating the so-called travel ghost effect, known in the motion picture art.

In Figure 3, 24 is a suitable lens for receiving light rays of suitable light source 25 reflected from object 26, and bringing said light rays to a focus in focal plane between horizontally reciprocating plate 4 and disc 9. 27 is a suitable mirror which serves as a guide for a living object 26 to determine the centralization of image at focal plane between horizontally reciprocating plate 4 and disc 9.

In Figure 4, cam wheel 29 is fixed on shaft 11 and vertically reciprocates plate 28 on pin 30.

In Figure 5, 31 is a horizontally reciprocating plate having a vertical slot 32, and reciprocated by arm 33 attached to worm gear 34 fixed on shaft 35. Revolving disc 36 having a plurality of slots 37 is fixed on shaft 38 which drives worm 39. The relation between worm 39 and worm gear 34 is such that each time one horizontal slot 37 in disc 36 moves vertically a distance equivalent to the length of slot 32 in horizontally reciprocating plate 31, the vertical slot 32 will have moved horizontally a distance equivalent to the width of said vertical slot 32.

Fixed on plate 31 by pins 40, 41, 42 and 43 is an electro-magnetic light shutter assembly electrically connected and responsive to output terminals 44 and 45 of radio receiving device 46 having aerial and ground connections 47 and 48 respectively. The electro-magnetic light shutter assembly is composed of a permanent magnet 49, armature coil 50, armature shaft 51, armature shaft support bracket 52, retarding hair spring 53, and shutter blade 54 fixed on shaft 51. The drawing shows coil 50 mounted on armature core of shaft 51, but it should be understood at this point that the electro-magnetic principle is the same as though the armature core was left bare with coils mounted on pole pieces of magnet 49.

In Figure 6, 55 is a light screen having an opening 56, a translucent section 57, and an opaque section 58, and operated by a solenoid coil 59. In true construction sections 57 and 58 would be a gradual variation from light gray in 57 to black in 58.

Figure 7 shows path of projecting light 62, projection lens 63, and image recording screen or similar structure 64.

Figure 8 shows the automatic speed synchronizing devices in which 65 is the main driving gear, fixed on shaft 66 of motor 67, and which drives gear 68 thru which square portion of shaft 69 slides freely. Shaft 69 has a shoulder on its upper end and is bored half way thru its centre to receive shaft 70 which is supported at its upper end by an externally threaded bushing 71, fitted into an internally threaded bracket 72, and having a knurled knob 73 for manual operation. Friction disc 74 (fixed on shaft 69) drives friction disc 75 which is fixed on shaft 76. Bracket 77 supports shaft 69 when the device is not operating. Weights 78 and 79 swing on levers 80 and 81 respectively, thereby actuating levers 82 and 83 respectively, which thereby actuate shaft 69. 84 is a speed indicator driven by gears 85 and 86.

When used with the transmitter, shaft 76 is coupled with shaft 11 shown in Fig. 1, but when used with the receiver it is coupled with shaft 38 shown in Fig. 5.

While my invention is illustrated in what is considered its best application, it may have other embodiments without departing from its spirit. It is not, therefore, limited to the structure shown in the drawings. The drawings show its application to a radio system of transmission, but it is obvious that devices of this sort operate with a higher degree of efficiency with direct wire tranmission, therefore, this application is construed to cover direct wire as well as radio.

The operation of the device will be obvious from the above description. Film 3 is allowed to move intermittently across path of light 23 producing the well known effect of motion due to the retention of vision of the human eye. Slot 5 reciprocates horizontally just behind film 3 and moves a distance equivalent to the width of said slot 5 each time a slot 10 moves across surface of picture frame 13, allowing only a small portion of picture in frame 13 to be exposed to the light responsive device 14 at one time, and at such speed that entire surface of picture is explored within the period of time that film 3 is at rest. In order to prevent light responsive device 14 from receiving impulses while film 3 is in motion, I have provided revolving switch 20 which renders said light responsive device 14 inoperative when film 3 is in motion, and operative when film 3 is at rest. Impulses received by light responsive device 14 are relayed to radio transmitting device 17 which radiates them by means of aerial 18 and ground 19. In the case of direct wire transmission, impulses from light responsive device 14 are properly amplified and transmitted along metallic conductors direct to electro-magnetic shutter actuating coil 50 or solenoid coil 59.

This invention can also be used to transmit images of living objects as shown in Fig. 3. By this arrangement I eliminate film 3, sprocket wheel 1, and rotary switch 20, and focus the reflected light rays from living object 26 on a focal plane between horizontally reciprocating plate 4 and revolving disc 9 by means of a suitable lens 24. Mirror 27 serves as a guide for determining the centralization of images of moving objects on said focal plane. The mirror is adjusted to an angle at which the person being scanned can see his image in said mirror just as it occurs in the focal planes of transmitter and receiver and on the projection screen of the receiver.

Where space will not permit the use of revolving disc 9 or revolving disc 36, I propose to use vertically reciprocating plate 28 in combination with horizontally reciprocating plate 4 as shown in Fig. 4, or in similar combination with horizontally reciprocating plate 31.

The relation between and the operation of horizontally reciprocating plate 31 and revolving disc 36 are identical with that of horizontally reciprocating plate 4 and revolving disc 9, except that the light rays passing thru the focal plane between plate 31 and disc 36 are projected and focused upon a suitable screen 64 by means of a suitable lens assembly 63. Said screen 64 can be opaque for reflective observation, or translucent for refractive observation of the image, or it can have a surface sensitive to actinic rays for making photographs of received images.

Impulses radiated from aerial 18 and ground 19 are received by aerial 47 and ground 48 of radio receiving device 46 which relays them to the electro-magnetic shutter actuating coil 50 or solenoid coil 59. Fig. 5 shows shutter blade 54 open in response to impulses from said radio receiving device 46, and exposing cross point of slots 32 and 37. When no current is passed thru coil 59, spring 53 rotates shaft 51 which causes shutter 54 to cover slot 32, thereby concealing cross point of slots 32 and 37. When a current is passed thru coil 50, a magnetic field is created which reacts with the permanent magnet 49 which rotates shaft 51 in the opposite direction, causing shutter 54 to open slot 32 and again expose cross point of slots 32 and 37.

I have provided light screen 55, as it gives better tone quality to the reproduced image when the devices are operated at slow speed, which is essential in making photographs. Plunger 60 is drawn against the tension of spring 61 directly in proportion to the flow of current in solenoid coil 59, thereby imparting dark and light shadows and high lights to the reproduced image in likeness to the original.

The operation of the driving means for both the transmitting and the receiving devices are identical. By observing speed indicator 84, and adjusting bushing 71 by means of knob 73, disc 74 can be raised or lowered while motor 67 is running, until disc 75 acquires the required speed. The required speed of disc 75 is automatically maintained by the relation between weights 78 and 79 and motor shaft 66. Centrifugal force of weights 78 and 79 raise and lower disc 74 in proportion to increase or decrease in speed of shaft 66, compensating for the increase or decrease in speed of said shaft 66, thereby maintaining constant speed of disc 75.

What I claim as new and desire to secure by Letters Patent is:

1. The combination with a radio transmitting device and a motion picture film actuating device, of means for exploring images of moving objects on said film in parallel linearly-aligned groups of component parts of definite areas, in vertical uni-directional paths, successively adjacent from left to right, then from right to left, and then from left to right again, etc.; comprising a horizontally reciprocating opaque structure having a vertical slot of definite size, and operating in conjunction with a revolving opaque structure having a plurality of equidistant radial slots of definite size, and a light responsive device which reacts with light rays passing thru said film and successive cross points of said vertical slot and each of said radial slots, and relays corresponding electrical impulses to said radio transmitting device, a rotary electric switch driven by said film actuating device, and controlling impulses from said light responsive device; said switch to render said light responsive device inoperative when said film is in motion, and operative when said film is at rest.

2. The combination with a radio transmitting device and a device for transmitting images of moving objects, of means for exploring said moving objects in parallel linearly-aligned groups of component parts of definite areas, in vertical uni-directional paths, successively adjacent from left to right, then from right to left, and then from left to right again, etc.; comprising a lens for focusing reflected light rays from said objects upon a focal plane between a horizontally reciprocating, vertically slotted opaque structure, and a revolving, radially slotted opaque structure, and a light responsive device which reacts with light rays reflected from said objects and passing thru said focal plane, and relays corresponding electrical impulses to said radio transmitting device.

3. The combination with a radio transmitting device and means for transmitting images of moving objects, of a device comprising a mirror surfaced structure located at a point where its reflected light rays act as an indicator for determining the centralization of images of moving objects upon a focal plane in a device for transmitting said images of moving objects.

4. The combination with a radio receiving device and means for reproducing images of moving objects, of means for reconstructing said images of moving objects in parallel linearly-aligned groups of component parts of definite areas, in vertical uni-directional paths, successively adjacent from left to right, then from right to left, and then from left to right again, etc.; comprising a horizontally reciprocating opaque structure having a vertical slot of definite size, and operating in conjunction with a revolving opaque structure having a plurality of equidistant radial slots of definite size. A light shutter device responsive to impulses from said radio receiving device, which reciprocates with said vertical slot, and modulates light rays passing thru said vertical slot, said radial slots, and a lens for projecting reconstructed images upon a screen.

5. The combination with a radio receiving device and an image reconstructing means, of an electro-magnetic light modulating device, responsive to impulses from said radio receiving device; comprising a slot, a light shutter opening or closing said slot during a partial rotation of said shutter about an axis parallel to said slot, said shutter having attached to its shaft an armature reacting in a constant magnetic field with current fluctuations from said radio receiving device to open said slot, and a spring tension for closing said slot.

6. The combination with a radio receiving device and an image reconstructing means, of an electro-magnetic light graduating device, responsive to said radio receiving device; comprising a light screen having an open section, a semi-transparent section, and an opaque section, said screen having a plunger attached which magnetically reacts with a solenoid coil on impulses from said radio receiving device, and a spring tension attached to said screen.

7. The method of converting modulated electrical impulses into like modulated light impulses, which consists of modulating the light passing thru a reciprocating slot, by means of an electro-magnetic light shutter attached to said slot, which partially rotates about an axis parallel to said slot to open said slot by induced magnetism in the armature of said shutter, and to close said slot by a retarding spring tension, said shutter opening the entire length of said slot but only effective in successive definite areas of said slot.

WILLIAM MALM.